United States Patent
Pope et al.

(10) Patent No.: US 8,043,998 B2
(45) Date of Patent: Oct. 25, 2011

(54) METHOD FOR TREATING A FRACTURED FORMATION WITH A NON-IONIC FLUORINATED POLYMERIC SURFACTANT

(75) Inventors: Gary A. Pope, Cedar Park, TX (US); Jimmie R. Baran, Jr., Prescott, WI (US); John Skildum, North Oaks, MN (US); Vishal Bang, Houston, TX (US); Mukul M. Sharma, Austin, TX (US)

(73) Assignees: Board of Regents, The University of Texas System, Austin, TX (US); 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/532,689

(22) PCT Filed: Dec. 30, 2007

(86) PCT No.: PCT/US2007/089185
§ 371 (c)(1),
(2), (4) Date: Jan. 27, 2010

(87) PCT Pub. No.: WO2008/118244
PCT Pub. Date: Oct. 2, 2008

(65) Prior Publication Data
US 2010/0137169 A1    Jun. 3, 2010

Related U.S. Application Data

(60) Provisional application No. 60/896,888, filed on Mar. 23, 2007.

(51) Int. Cl.
*C09K 8/60*    (2006.01)
*E21B 21/00*    (2006.01)

(52) U.S. Cl. .................... 507/205; 166/305.1; 166/311; 507/224; 507/247; 507/252; 507/261

(58) Field of Classification Search .............. 507/205, 507/224, 247, 252, 261; 166/305.1, 311
See application file for complete search history.

(56) References Cited

U.S. PATENT DOCUMENTS

| | | |
|---|---|---|
| 2,732,398 A | 1/1956 | Brice et al. |
| 2,803,615 A | 8/1957 | Ahlbrecht et al. |
| 3,554,288 A | 1/1971 | Ross |

(Continued)

FOREIGN PATENT DOCUMENTS

| CA | 2009732 | 8/1990 |
|---|---|---|

(Continued)

OTHER PUBLICATIONS

Supplementary European Search Report for EP 07870113.3 dated Feb. 9, 2010.

(Continued)

*Primary Examiner* — Timothy J. Kugel
(74) *Attorney, Agent, or Firm* — Edwin S. Flores; Chalker Flores, LLP

(57) ABSTRACT

The present invention includes compositions and methods of treating a hydrocarbon-bearing formation, the formation having at least one fracture, by contacting the fracture with a composition that includes a solvent and a nonionic fluorinated polymeric surfactant, wherein the composition interacts with at least a portion of the proppants in the fracture.

20 Claims, 2 Drawing Sheets

U.S. PATENT DOCUMENTS

| | | | |
|---|---|---|---|
| 3,653,442 | A | 4/1972 | Ross |
| 3,787,351 | A | 1/1974 | Olson |
| 3,902,557 | A | 9/1975 | Shaughnessy et al. |
| 4,018,689 | A | 4/1977 | Thompson |
| 4,329,236 | A | 5/1982 | Alford et al. |
| 4,432,882 | A | 2/1984 | Raynolds et al. |
| 4,440,653 | A | 4/1984 | Briscoe et al. |
| 4,460,791 | A | 7/1984 | Cooke |
| 4,557,837 | A | 12/1985 | Clark et al. |
| 4,565,639 | A | 1/1986 | Penny et al. |
| 4,609,043 | A | 9/1986 | Cullick |
| 4,702,849 | A | 10/1987 | Penny |
| 4,767,545 | A | 8/1988 | Karydas et al. |
| 4,823,873 | A | 4/1989 | Karydas |
| 4,921,619 | A | 5/1990 | Karydas |
| 4,923,009 | A | 5/1990 | Watkins |
| 4,975,468 | A | 12/1990 | Yiv |
| 4,993,448 | A | 2/1991 | Karydas et al. |
| 4,997,580 | A | 3/1991 | Karydas et al. |
| 5,042,580 | A | 8/1991 | Cullick et al. |
| 5,143,958 | A | 9/1992 | Lockhart et al. |
| 5,181,568 | A | 1/1993 | McKown et al. |
| 5,186,257 | A | 2/1993 | Stahl et al. |
| 5,219,476 | A | 6/1993 | Lockhart et al. |
| 5,247,993 | A | 9/1993 | Sarem et al. |
| 5,310,882 | A | 5/1994 | Chaleff |
| 5,338,465 | A | 8/1994 | Lockhart et al. |
| 5,358,052 | A | 10/1994 | Gidley |
| 5,415,229 | A | 5/1995 | Sydansk |
| 5,477,924 | A | 12/1995 | Pollack |
| 5,733,526 | A | 3/1998 | Trevino et al. |
| 5,965,659 | A | 10/1999 | Kubo et al. |
| 6,113,919 | A | 9/2000 | Reiss et al. |
| 6,127,430 | A | 10/2000 | Baran, Jr. et al. |
| 6,206,102 | B1 | 3/2001 | Pusch et al. |
| 6,255,263 | B1 | 7/2001 | Ryan |
| 6,274,060 | B1 | 8/2001 | Sakashita et al. |
| 6,443,230 | B1 | 9/2002 | Boles et al. |
| 6,579,572 | B2 | 6/2003 | Espin et al. |
| 6,660,693 | B2 | 12/2003 | Miller et al. |
| 6,664,354 | B2 | 12/2003 | Savu et al. |
| 6,689,854 | B2 | 2/2004 | Fan et al. |
| 6,729,409 | B1 | 5/2004 | Gupta et al. |
| 6,805,198 | B2 | 10/2004 | Huang et al. |
| 6,852,781 | B2 | 2/2005 | Savu et al. |
| 6,911,417 | B2 | 6/2005 | Chan et al. |
| 6,945,327 | B2 | 9/2005 | Ely et al. |
| 6,972,274 | B1 | 12/2005 | Slikta et al. |
| 7,199,197 | B2 | 4/2007 | Caldwell et al. |
| 2001/0016562 | A1 | 8/2001 | Muir et al. |
| 2003/0083448 | A1 | 5/2003 | Fan et al. |
| 2003/0092581 | A1 | 5/2003 | Crews |
| 2004/0186254 | A1 | 9/2004 | Fan et al. |
| 2005/0142563 | A1 | 6/2005 | Haddad et al. |
| 2005/0148491 | A1 | 7/2005 | Savu et al. |
| 2005/0245401 | A1 | 11/2005 | Chan et al. |
| 2006/0052499 | A1 | 3/2006 | Chang et al. |
| 2007/0015669 | A1 | 1/2007 | Zhang |
| 2007/0029085 | A1 | 2/2007 | Panga et al. |
| 2007/0225176 | A1* | 9/2007 | Pope et al. ............ 507/221 |

FOREIGN PATENT DOCUMENTS

| | | |
|---|---|---|
| EP | 1 999 339 | 12/2008 |
| EP | 2 054 485 | 5/2009 |
| EP | 2 132 240 A1 | 12/2009 |
| JP | 3-219248 | 9/1991 |
| JP | 7-101803 | 4/1995 |
| JP | 8-193021 | 7/1996 |
| WO | 2005/028589 A1 | 3/2005 |
| WO | 2005/035936 A1 | 4/2005 |
| WO | 2005/100007 A2 | 10/2005 |
| WO | 2006/028608 A1 | 3/2006 |
| WO | 20071097975 A2 | 8/2007 |

OTHER PUBLICATIONS

Extended European Search Report for EP 07 87 0115 dated Aug. 5, 2010.

Adibhatla, B., et al., "Effect of surfactants on wettability of near-wellbore regions of gas reservoirs," J Petr Sci Engr (2006), 52:227-236.

Al-Anazi et al., "Laboratory Measurements of Condensate Blocking and Treatment for Both Low and High Permeability Rocks", 2002, SPE 77546, Society of Petroleum Engineers Inc., pp. 1-9.

Al-Anazi et al., "A Successful Methanol Treatment in a Gas-Condensate Reservoir: Field Application", Mar. 2003, SPE 80901, Society of Petroleum Engineers Inc., pp. 1-9.

Al-Anazi, "Experimental Measurements of Condensate Blocking and Treatments in Low and High Permeability Cores" (Thesis), Dec. 2003, pp. 1-474.

Ayyalasomayajula et al., "Phase Behavior Modeling of Hydrocarbon-Methanol-Water Mixtures by Peng-Robinson and SAFT Equations of State", Sep. 2002, SPE 77575, Society of Petroleum Engineers Inc., pp. 1-8.

Ayyalasomayajula, "Prediction of Bulk and Interfacial Thermodynamic Properties of Polar Mixtures by Statistical Associating Fluid Theory" (Thesis), May 2003, pp. 1-268.

Bang, "Phase Behavior Study of Hydrocarbon-Water-Alcohol Mixtures" (Thesis) May 2005, pp. 1-138.

Chowdhury, "Reservoir Simulation of Asphaltene Precipitation and of Gas Condensates" (Thesis), Dec. 2003, pp. 1-227.

Chowdhury et. al., "Semi-Analytical Method to Predict Well Deliverability in Gas-Condensate Reservoirs", Sep. 4, SPE 90320, Society of Petroleum Engineers Inc., pp. 1-13.

Crema et al., "Foaming of Anhydrous Methanol for Well Stimulation", Apr. 1985, SPE 13565, Society of Petroleum Engineers Inc., 4 pages.

Du et al., "Use of Solvents to Improve the Productivity of gas Condensate Wells", Oct. 2000, SPE 62935, Society of Petroleum Engineers Inc., pp. 1-8.

Fahes et al., "Wettability Alteration to Intermediate Gas-Wetting in Gas-Condensate Reservoirs at High Temperatures", Oct. 2005, SPE 96184, Society of Petroleum Engineers Inc., pp. 1-14.

Gadde et al., "Modeling Proppant Settling in Water-Fracs", Sep. 2004, SPE 89875, Society of Petroleum Engineers Inc., pp. 1-10.

International Search Report and Written Opinion for PCT/US2007/076562 dated Sep. 29, 2008.

Kumar, "A Simulation Study of Carbon Sequestration in Deep Saline Aquifers" (Thesis), Aug. 2004, pp. 1-192.

Lee, "Phase Equilibria in Systems Containing Hydrocarbon, Water and Methanol" (Thesis), May 2003, pp. 1-92.

Li, K., et al., "Experimental Study of Wettability Alteration to Preferential Gass-Wetting in Porous Media and Its Effects," SPE Reservoir Eval and Eng (2000), 3:139-149.

Mahadevan et al., "Clean-up of Water Blocks in Low Permeability Formations", Oct. 2003, SPE 84216, Society of Petroleum Engineers Inc., pp. 1-8.

Mahadevan et al., "Evaporative Clean-up of Water-Blocks in Gas Wells", Apr. 2005, SPE 94215, Society of Petroleum Engineers Inc., pp. 1-11.

Narayanaswamy et al., "Effect of Heterogeneity on the Non-Darcy Flow Coefficient", Mar. 1998, SPE 39979, Society of Petroleum Engineers Inc., pp. 1-17.

Nasr-El-Din et al., "Surface tension of HCI-based stimulation fluids at high temperatures", Jun. 2004, Journal of Petroleum Science and Engineering, vol. 43(1-2), pp. 57-73.

Ortiz et al., "Low-pH methanol: an alternative for stimulation in water-sensitive, tight, dirty sandstones", 1986, SPE Production Engineering (0885-9221), vol. 1(3). pp. 195-202.

Parekh et al., "Cleanup of Water Blocks in Depleted Low-Permeability Reservoirs", Sep. 2004, SPE 89837, Society of Petroleum Engineers Inc., pp. 1-12.

Pope et al., "Modeling Relative Permeability Effects in Gas-Condensate Reservoirs using a New Trapping Model", Sep. 1998, SPE 49266, Society of Petroleum Engineers Inc., pp. 1-8.

Product Information: 3M™ Novec Fluorosurfactant FC-4430, Oct. 2005, 6 pages.

Product Information: 3M™ Novec Fluorosurfactant FC 4432, Oct. 2005, 6 pages.

Product Information: 3M™ Novec Fluorosurfactant FC 4434, Jan. 2005, 4 pages.

Rai, "Parametric Study of Relative Permeability Effects on Gas-Condensate core Floods and Wells" (Thesis), Dec. 2003, pp. 1-319.

Sharma, "Modeling Gas Condensate Reservoirs and Development of a New Hybrid Well Model" (Thesis), May 2003, pp. 1-231.

Sharma et al., "Slick Water and Hybrid Fracs in the Bossier: Some Lessons Learnt", Sep. 2004, SPE 89876, Society of Petroleum Engineers Inc., pp. 1-12.

Tang, G-Q., et al., " Relative Permeability Modification in Gas-Liquid Systems Through Wettability Alteration to Intermediate Gas-Wetting," Oct. 2000, SPE 62934, Society of Petroleum Engineers Inc., pp. 1-15.

U.S. Department of Energy, "Comments on the Outlook for Balancing Natural Gas Supply and Demand, EPAct Section 1818: Natural Gas Shortage Report," http://www.fossil.energy.gov/epactiSection_1818/comments.html, accessed Mar. 16, 2008.

Wu et al., "Modeling Non-Equilibrium Mass Transfer Effects for a Gas Condensate Field", Mar. 1998, SPE 39764, Society for Petroleum Engineers Inc., pp. 1-16.

US 6,492,477, 12/2002, Savu et al. (withdrawn)

* cited by examiner

METHOD FOR TREATING A FRACTURED FORMATION WITH A NON-IONIC FLUORINATED POLYMERIC SURFACTANT

CROSS REFERENCE TO RELATED APPLICATIONS

This application is a national stage filing under 35 U.S.C. 371 of PCT/US2007/089185, filed Dec. 30, 2007, which claims priority to U.S. Provisional Application No. 60/896,888, filed Mar. 23, 2007, the disclosure of which is incorporated by reference in its entirety herein.

BACKGROUND OF THE INVENTION

Various approaches have been tried to increase the hydrocarbon production of low-permeability wells (e.g., oil and gas wells). One approach, for example, involves a fracturing and propping operation (e.g., prior to, or simultaneously with, a gravel packing operation) to increase the permeability of the hydrocarbon-bearing geological formation adjacent to the wellbore. The resulting propped fracture can be measured to determine how easily fluids (e.g., oil and gas) can flow through the propped fracture (i.e., conductivity).

In some cases, fracturing operations are carried out with aqueous fracturing fluids, often resulting in water being left behind in the fracture. Typically, such water is reduced or removed via a clean-up operation.

While these approaches have been found useful to increase hydrocarbon production, it may be desirable in some instances, for example, to increase the conductivity of a propped fracture, particularly when at least one of brine or condensate is present in the fracture.

SUMMARY OF THE INVENTION

In one aspect, the present invention provides a method of treating a hydrocarbon-bearing formation having at least one fracture, wherein the fracture has a volume, and wherein the fracture has a plurality of proppants therein, the method comprising:

contacting the fracture with an amount of a composition, wherein the amount of the composition is based at least partially on the volume of the fracture, wherein the composition comprises solvent and a nonionic fluorinated polymeric surfactant, and wherein the nonionic fluorinated polymeric surfactant comprises:

at least one divalent unit represented by formula:

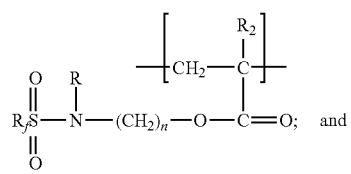

at least one divalent unit represented by formula:

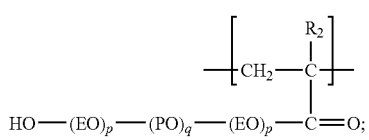

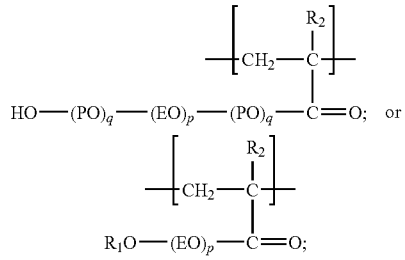

wherein
$R_f$ represents a perfluoroalkyl group having from 1 to 8 carbon atoms;
$R$, $R_1$ and $R_2$ are each independently hydrogen or alkyl of 1 to 4 carbon atoms;
n is an integer from 2 to 10;
EO represents —$CH_2CH_2O$—;
each PO independently represents —$CH(CH_3)CH_2O$— or —$CH_2CH(CH_3)O$—;
each p is independently an integer of from 1 to about 128; and
each q is independently an integer of from 0 to about 55; and
allowing the nonionic polymeric fluorinated surfactant to interact with at least a portion of the plurality of proppants.

In some embodiments, the fracture has brine therein. In some embodiments, the composition is contacting the fracture, the fracture has a temperature, and the nonionic fluorinated polymeric surfactant has a cloud point that is above the temperature of the fracture. In some embodiments, the composition is contacting the fracture, and the fracture is substantially free of precipitated salt. In some embodiments, the hydrocarbon-bearing formation is a clastic formation. In some embodiments, the hydrocarbon-bearing formation is a non-clastic formation. In some embodiments, the solvent comprises at least one of a polyol or polyol ether, wherein the polyol and polyol ether independently have from 2 to 25 carbon atoms; and wherein the solvent comprises at least one of a monohydroxy alcohol, ether, or ketone independently having from 1 to 4 carbon atoms. In some embodiments, the polyol or polyol ether independently is at least one of 2-butoxyethanol, ethylene glycol, propylene glycol, polypropylene glycol), 1,3-propanediol, 1,8-octanediol, diethylene glycol monomethyl ether, ethylene glycol monobutyl ether, or dipropylene glycol monomethyl ether. In some embodiments, the solvent comprises at least one monohydroxy alcohol independently having from 1 to 4 carbon atoms In some embodiments, the composition further comprises water. In some embodiments, $R_f$ is perfluorobutyl. In some embodiments, the nonionic fluorinated polymeric surfactant has a number average molecular weight in the range of from 1,000 to 30,000, 40,000, 50,000, 75,000 100,000 or more grams/mole. In some embodiments, the plurality of proppants comprises at least one of sand, sintered bauxite, thermoplastic, ceramics (i.e., glasses, crystalline ceramics, glass-ceramics, and combinations thereof), organic matter or clay. In some embodiments, the method may further comprise obtaining hydrocarbons from a well bore penetrating the hydrocarbon-bearing formation.

In some embodiments, the hydrocarbon-bearing formation has at least one first gas conductivity prior to contacting the fracture with the composition and at least one second gas conductivity after contacting the fracture with the composition, and wherein the second gas relative conductivity is at least 5 (in some embodiments, at least 10, 15, 20, 25, 50, 75, 100, 125, or even at least 150 or more) percent higher than the first gas conductivity. In some embodiments, the gas conductivity is a gas relative conductivity.

In one aspect, the present invention provides a method of treating a hydrocarbon-bearing formation having at least one fracture, wherein the fracture has a volume, and wherein the fracture has a plurality of proppants therein, the method comprising:
pre-treating the hydrocarbon-bearing formation with a fluid that at least partially solubilizes or at least partially displaces the brine in the fracture;
contacting the proppants in the fracture with an amount of a composition, wherein the amount of the composition is based at least partially on the volume of the fracture, wherein the composition comprises solvent and a nonionic fluorinated polymeric surfactant, and wherein the nonionic fluorinated polymeric surfactant comprises:
at least one divalent unit represented by formula:

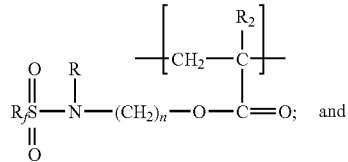

and at least one divalent unit represented by formula:

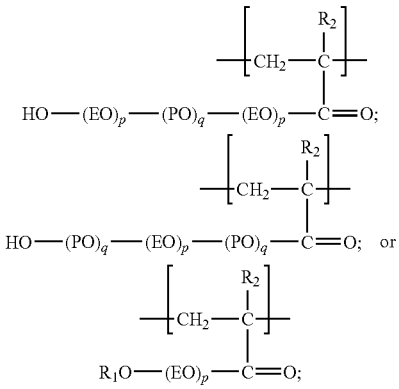

wherein
$R_f$ represents a perfluoroalkyl group having from 1 to 8 carbon atoms;
R, $R_1$ and $R_2$ are each independently hydrogen or alkyl of 1 to 4 carbon atoms;
n is an integer from 2 to 10;
EO represents —$CH_2CH_2O$—;
each PO independently represents —$CH(CH_3)CH_2O$— or —$CH_2CH(CH_3)O$—
each p is independently an integer of from 1 to about 128; and
each q is independently an integer of from 0 to about 55; and
allowing the nonionic polymeric fluorinated surfactant to interact with at least a portion of the proppants. In some embodiments, the fracture has a temperature, and the nonionic fluorinated polymeric surfactant has a cloud point that is above the temperature of the fracture. In some embodiments, when the composition is contacting the fracture, the nonionic fluorinated polymeric surfactant has a cloud point that is above the temperature in the fracture. In some embodiments, the composition is contacting the fracture, the fracture is substantially free of precipitated salt. In some embodiments, the hydrocarbon-bearing formation is a clastic formation. In some embodiments, the hydrocarbon-bearing formation is a non-clastic formation.

In some embodiments, the plurality of proppants comprises at least one of sand, glass, sintered bauxite, ceramics (i.e., glasses, crystalline ceramics, glass-ceramics, and combinations thereof), thermoplastic, organic matter or clay. In some embodiments, the fluid comprises at least one of toluene, diesel, heptane, octane, or condensate. In some embodiments, the fluid comprises at least one of a polyol or polyol ether, wherein the polyol and polyol ether independently have from 2 to 25 carbon atoms. In some embodiments, the polyol or polyol ether independently is at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether. In some embodiments, the fluid further comprises at least one monohydroxy alcohol, ether, or ketone independently having from 1 to 4 carbon atoms. In some embodiments, the fluid comprises at least one of water, methanol, ethanol, or isopropanol. In some embodiments, the fluid comprises at least one of methane, carbon dioxide, or nitrogen. In some embodiments, the fracture has at least one first conductivity prior to contacting the fracture with the composition and at least one second conductivity after contacting the fracture with the composition, and wherein the second conductivity is at least 5 percent higher than the first conductivity. In some embodiments of the present invention, the methods of the present invention will often increase the productivity of the well as the conductivity of the fracture increases.

BRIEF DESCRIPTION OF THE DRAWINGS

For a more complete understanding of the features and advantages of the present invention, reference is now made to the detailed description of the invention along with the accompanying figures which.

DETAILED DESCRIPTION OF THE INVENTION

Figures 1, 2:
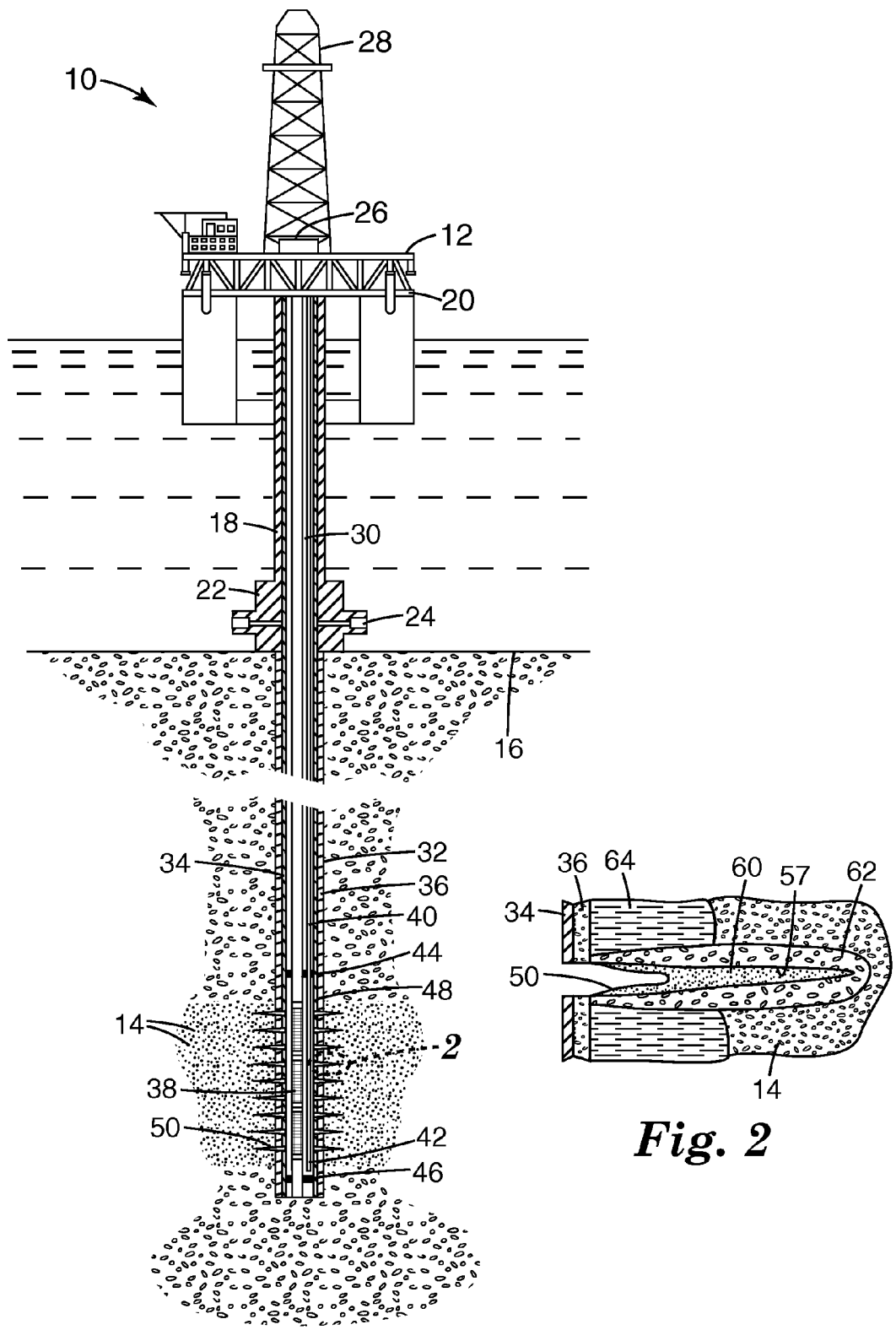
FIG. 1 is a schematic illustration of an exemplary embodiment of an offshore oil and gas platform operating an apparatus for treating a near wellbore region according to the present invention.
FIG. 2 is an expanded view of FIG. 1 that shows the near wellbore region in greater detail.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims. The following definitions of terms apply throughout the specification and claims.

The term "brine" refers to water having at least one dissolved electrolyte salt therein (e.g., having any nonzero concentration, and which may be, in some embodiments, less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or even greater than 200,000 ppm).

The term "cloud point" of a surfactant refers to the temperature at which a nonionic surfactant becomes non-homogeneous in water. This temperature can depend on many variables (e.g., surfactant concentration, solvent concentration, solvent composition, water concentration, electrolyte composition and concentration, oil phase concentration and composition, and the presence of other surfactants).

The term "downhole conditions" refers to the temperature, pressure, humidity, and other conditions that are commonly found in subterranean formations.

The term "homogeneous" means macroscopically uniform throughout and not prone to spontaneous macroscopic phase separation.

The term "hydrocarbon-bearing formation" includes both hydrocarbon-bearing formations in the field (i.e., subterranean hydrocarbon-bearing formations) and portions of such hydrocarbon-bearing formations (e.g., core samples).

The term "fracture" refers to a fracture that is man-made. In the field, for example, fractures are typically made by injecting a fracturing fluid into a subterranean geological formation at a rate and pressure sufficient to open a fracture therein (i.e., exceeding the rock strength).

The term "hydrolyzable silane group" refers to a group having at least one Si—O—Z moiety that undergoes hydrolysis with water at a pH between about 2 and about 12, wherein Z is H or substituted or unsubstituted alkyl or aryl.

The term "nonionic" refers to surfactants being free of ionic groups (e.g., salts) or groups (e.g., —$CO_2H$, —$SO_3H$, —$OSO_3H$, —$P(=O)(OH)_2$) that are readily substantially ionized in water.

The term "normal boiling point" refers to the boiling point at a pressure of one atmosphere (100 kPa).

The term "polymer" refers to a molecule of molecular weight of at least 1000 grams/mole, the structure of which includes the multiple repetition of units derived, actually or conceptually, from molecules of low relative molecular mass.

The term "polymeric" refers to including a polymer.

The term "solvent" refers to a homogenous liquid material (inclusive of any water with which it may be combined) that is capable of at least partially dissolving the nonionic fluorinated polymeric surfactant(s) with which it is combined at 25° C.

The term "water-miscible" means soluble in water in all proportions.

The term "productivity" as applied to a well refers to the capacity of a well to produce hydrocarbons; that is, the ratio of the hydrocarbon flow rate to the pressure drop, where the pressure drop is the difference between the average reservoir pressure and the flowing bottom hole well pressure (i.e., flow per unit of driving force).

As used herein, the term "substantially free of precipitated salt" refers to the amount of salts found in water under downhole conditions that precipitate and do not interfere with the interaction (e.g., adsorption) of the surfactant with the formation, fracture or proppants, and in some instances the amount of salts may be zero. In one example, substantially free of precipitated salt is an amount of salt that is the less than 5% higher than the solubility product at a given temperature and pressure. In another example, a formation becomes substantially free of precipitated salt when the amount of salt in the formation has been reduced, dissolved or displaced such that the salts do not interfere with the binding of the surfactant with the formation.

Many natural gas wells, especially those having so called "tight" or very low permeability formations, are stimulated with propped fractures to increase their productivity index (PI). The increase in PI is often not as great as expected or desired, for example, due to damage in the fracture, liquid blocking and inertial or non-Darcy flow at high gas velocities. Applicants have discovered that the use of compositions comprising solvents and fluorosurfactants can be used to increase the conductivity of the fracture having proppants therein. Although not wanting the be bound by theory it is believed the mechanisms include an increase in the gas relative conductivity and a reduction of inertial effects that decrease the flow of gas at high rates when water and/or condensate is removed from the porous medium. Further, although not wanting to be bound by theory, it is believed that, the chemical treatment may be used in both clastic and carbonate formations since it is the hydraulic fracture that is primarily being treated rather than the formation. Often, a relatively small treatment volume may be needed since the pore volume in the propped fracture may be small. Some leak off to the formation may happen and may provide additional benefit by treatment of the rock immediately around the fracture, in some cases, but the primary stimulation target is the fracture itself. The treatment may be used in fractures in both natural gas wells and gas condensate wells. In some embodiments, for example, when the salinity is high, a preflush may be desirable.

Hydrocarbon-bearing formations that can be treated according to methods of the present invention have at least one fracture (in some embodiments, at least 2, 3, 4, 5, 6, 7, 8, 9, or even 10 or more fractures). The volume of a fracture can be measured using methods that are known in the art (e.g., by pressure transient testing of a fractured well). Typically, when a fracture is created in a hydrocarbon-bearing subterranean formation, the volume of the fracture can be estimated using at least one of the known volume of fracturing fluid or the known amount of proppant used during the fracturing operation. Non-limiting examples of formations that may be treated using the present invention include dry gas reservoirs, wet gas reservoirs, retrograde condensate gas reservoirs, tight gas reservoirs, gas storage reservoirs and combinations thereof.

The fractures in the hydrocarbon bearing formations that can be treated according to the present formation include proppants. Prior to delivering the proppants into the fracture, the proppants may comprise less that 0.1% by weight nonionic fluorinated polymeric surfactant, based on the total weight of the plurality of proppants. Exemplary proppants known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company. In some embodiments, the proppants form packs within a formation and/or wellbore. Proppants may be selected to be chemically compatible with the fluids and compositions described herein. Non-limiting examples of particulate solids include fracture proppant materials introducible into the formation as part of a hydraulic fracture treatment and sand control particulate introducible into the wellbore/formation as part of a sand control treatment such as a gravel pack or frac pack Compositions useful in practicing the present invention comprise a nonionic fluorinated polymeric surfactant and solvent.

Useful nonionic fluorinated polymeric surfactants comprise:

at least one divalent unit represented by formula:

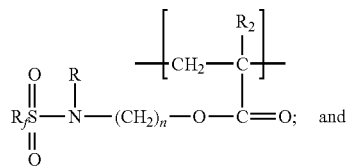

at least one divalent unit represented by formula:

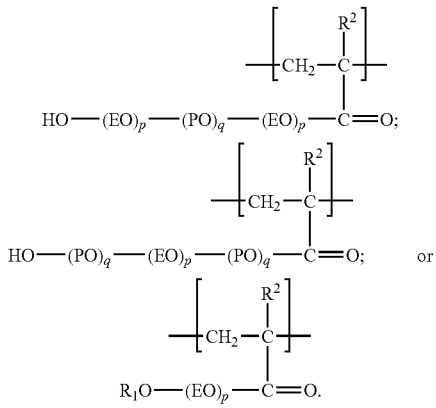

$R_f$ represents a perfluoroalkyl group having from 1 to 8 carbon atoms. Exemplary groups $R_f$ include perfluoromethyl, perfluoroethyl, perfluoropropyl, perfluorobutyl (e.g., perfluoro-n-butyl or perfluoro-sec-butyl), perfluoropentyl, perfluorohexyl, perfluoroheptyl, and perfluorooctyl.

R, $R_1$, and $R_2$ are each independently hydrogen or alkyl of 1 to 4 carbon atoms (e.g., methyl, ethyl, n-propyl, isopropyl, butyl, isobutyl, or t-butyl).

n is an integer from 2 to 10.

EO represents $-CH_2CH_2O-$.

Each PO independently represents $-CH(CH_3)CH_2O-$ or $-CH_2CH(CH_3)O-$.

Each p is independently an integer of from 1 to about 128.

Each q is independently an integer of from 0 to about 55. In some embodiments, q may be in a range of from 1 to 55 and the ratio p/q has a value of from at least 0.5, 0.75, 1 or 1.5 to 2.5, 2.7, 3, 4, 5, or more.

The nonionic fluorinated polymeric surfactants described hereinabove are typically preparable by copolymerization of:

at least one compound represented by formula

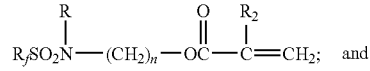

at least one compound represented by formula:

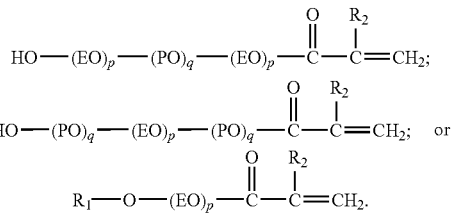

The nonionic fluorinated polymeric surfactants described above can be prepared, for example, by techniques known in the art (e.g., by free radical initiated copolymerization of a nonafluorobutanesulfonamido group-containing acrylate with a poly(alkyleneoxy)acrylate (e.g., monoacrylate or diacrylate) or mixtures thereof). Adjusting the concentration and activity of the initiator, the concentration of monomers, the temperature, and the chain-transfer agents can control the molecular weight of the polyacrylate copolymer. The description of the preparation of such polyacrylates is described, for example, in U.S. Pat. No. 3,787,351 (Olson), the disclosure of which is incorporated herein by reference. Preparation of nonafluorobutanesulfonamido acrylate monomers are described, for example, in U.S. Pat. No. 2,803,615 (Ahlbrecht et al.), the disclosure of which is incorporated herein by reference. Examples of fluoroaliphatic polymeric esters and their preparation are described, for example, in U.S. Pat. No. 6,664,354 (Savu et al.), the disclosure of which is incorporated herein by reference.

Methods described above for making nonafluorobutylsulfonamido group-containing structures can be used to make heptafluoropropylsulfonamido groups by starting with heptafluoropropylsulfonyl fluoride, which can be made, for example, by the methods described in Examples 2 and 3 of U.S. Pat. No. 2,732,398 (Brice et al.), the disclosure of which is incorporated herein by reference.

Useful nonionic fluorinated polymeric surfactants typically have a number average molecular weight in the range of from 1,000 to 10,000 grams/mole, 20,000 grams/mole, 30,000 grams/mole, 40,000 grams/mole, 50,000 grams/mole or even 100,000 grams/mole although higher and lower molecular weights may also be useful. It is also within the scope of the present invention to use mixtures of nonionic fluorinated polymeric surfactants.

In some embodiments, the nonionic fluorinated polymeric surfactant is free of hydrolyzable silane groups. This may be advantageous, for example, by prolonging the storage-life of the composition.

Nonionic fluorinated polymeric surfactants useful in practicing the present invention interact with at least a portion of the plurality of proppants, (i.e., change the wettability of the proppants). Nonionic fluorinated polymeric surfactants may interact with the plurality of proppants, for example, by adsorbing to the surfaces of the proppants (in either clastic or non-clastic formations). Methods of determining the interaction of nonionic fluorinated polymeric surfactants with proppants include the measurement of the conductivity of the fracture.

In some embodiments, (e.g., in hydrocarbon-bearing clastic formations), nonionic fluorinated polymeric surfactants useful in practicing the present invention modify the wetting properties of the rock in a near wellbore region of a hydrocarbon-bearing formation (e.g., in the fracture). Although not wanting to be bound by theory, it is believed the nonionic fluorinated polymeric surfactants generally adsorb to clastic formations under downhole conditions.

Again, not wanting to be bound by theory, it is believed that nonionic fluorinated polymeric surfactants generally adsorb to the surfaces of proppants and the rock surface in fractured hydrocarbon-bearing clastic formation and typically remain at the target site for the duration of an extraction (e.g., 1 week, 2 weeks, 1 month, or longer).

In some embodiments, methods according to the present invention use a fluid. Fluids (including liquids and gases) useful in practicing the present invention at least one of at least partially solubilizes or at least partially displaces the brine in the hydrocarbon-bearing clastic formation. In some embodiments, the fluid at least partially displaces the brine in the hydrocarbon-bearing clastic formation. In some embodiments, the fluid at least partially solubilizes brine in the hydrocarbon-bearing clastic formation. Examples of useful fluids include polar and/or water-miscible solvents such as monohydroxy alcohols having from 1 to 4 or more carbon atoms (e.g., methanol, ethanol, isopropanol, propanol, or butanol); polyols such as glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, or dipropylene glycol) and triols (e.g., glycerol, trimethylolpropane); ethers (e.g., diethyl ether, methyl t-butyl ether, tetrahydrofuran, p-dioxane); polyol ethers such as glycol ethers (e.g., ethylene glycol monobutyl ether, diethylene glycol monomethyl ether, dipropylene glycol monomethyl ether, propylene glycol monomethyl ether, or those glycol ethers available under the trade designation "DOWANOL" from Dow Chemical Co., Midland, Mich.); and ketones (e.g., acetone or 2-butanone). Useful fluids also include liquid or gaseous hydrocarbons (e.g., toluene, diesel, heptane, octane, condensate, methane, and isoparaffinic solvents obtained from Total Fina, Paris, France, under trade designation "ISANE" and from Exxon Mobil Chemicals, Houston, Tex., under the trade designation "ISOPAR") and other gases (e.g., nitrogen and carbon dioxide).

The solvent may be a single component or a mixture of components. Solvents useful in practicing the present invention polar solvents such as alcohols (e.g., methanol, ethanol, isopropanol, propanol, and butanol), glycols (e.g., ethylene glycol and propylene glycol), and glycol ethers (e.g., ethylene glycol monobutyl ether and glycol ethers available from Dow Chemical Co., Midland, Mich., under the trade designation "DOWANOL"); easily gasified fluids (e.g., ammonia, low molecular weight hydrocarbons or substituted hydrocarbons, condensate, and supercritical or liquid carbon dioxide), and mixtures thereof. In some embodiments, the solvent is water-miscible.

In some embodiments, the solvent comprises at least one of a polyol or polyol ether and at least one monohydroxy alcohol, ether, or ketone independently having from 1 to 4 carbon atoms, or a mixture thereof. In the event that a component of the solvent is a member of two functional classes, it may be used as either class but not both. For example, ethylene glycol methyl ether may be a polyol ether or a monohydroxy alcohol, but not as both simultaneously.

In some embodiments, the solvent consists essentially of (i.e., does not contain any components that materially affect water solubilizing or displacement properties of the composition under downhole conditions) at least one of a polyol independently having from 2 to 25 (in some embodiments, 2 to 10) carbon atoms or polyol ether independently having from 2 to 25 (in some embodiments, 2 to 10) carbon atoms, and at least one monohydroxy alcohol independently having from 1 to 4 carbon atoms, ether independently having from 1 to 4 carbon atoms, or ketone having from 1 to 4 carbon atoms, or a mixture thereof.

In some embodiments, the solvent comprises at least one polyol and/or polyol ether that independently has from 2 to 25 (in some embodiments from 2 to 20 or even from 2 to 10) carbon atoms.

As used herein in referring to the solvent, the term "polyol" refers to an organic molecule consisting of C, H, and O atoms connected one to another by C—H, C—C, C—O, O—H single bonds, and having at least two C—O—H groups. For example, useful polyols may have independently from 2 to 8 carbon atoms or independently from 2 to 6 carbon atoms, and useful polyol ethers may independently have from 3 to 10 carbon atoms, for example, independently from 3 to 8 carbon atoms or independently from 5 to 8 carbon atoms. Exemplary useful polyols include ethylene glycol, propylene glycol, poly(propylene glycol), 1,3-propanediol, trimethylolpropane, glycerol, pentaerythritol, and 1,8-octanediol.

As used herein in referring to the solvent, the term "polyol ether" refers to an organic molecule consisting of C, H, and O atoms connected one to another by C—H, C—C, C—O, O—H single bonds, and which is at least theoretically derivable by at least partial etherification of a polyol. Exemplary useful polyol ethers include diethylene glycol monomethyl ether, ethylene glycol monobutyl ether, and dipropylene glycol monomethyl ether. The polyol and/or polyol ether may have a normal boiling point of less than 450° F. (232° C.); for example, to facilitate removal of the polyol and/or polyol ether from a well after treatment.

In some embodiments, the polyol or polyol ether is independently at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether.

In some embodiments, the solvent further comprises at least one monohydroxy alcohol, ether, and/or ketone that may independently have up to (and including) 4 carbon atoms. It is recognized that, by definition, ethers must have at least 2 carbon atoms, and ketones must have at least 3 carbon atoms.

As used herein in referring to the solvent, the term "monohydroxy alcohol" refers to an organic molecule formed entirely of C, H, and O atoms connected one to another by C—H, C—C, C—O, O—H single bonds, and having exactly one C—O—H group. Exemplary monohydroxy alcohols having from 1 to 4 carbon atoms include methanol, ethanol, n-propanol, isopropanol, 1-butanol, 2-butanol, isobutanol, and t-butanol.

As used herein in referring to the solvent, the term "ether" refers to an organic molecule formed entirely of C, H, and O atoms connected one to another by C—H, C—C, C—O, O—H single bonds, and having at least one C—O—C group. Exemplary ethers having from 2 to 4 carbon atoms include diethyl ether, ethylene glycol methyl ether, tetrahydrofuran, p-dioxane, and ethylene glycol dimethyl ether.

As used herein in referring to the solvent, the term "ketone" refers to an organic molecule formed entirely of C, H, and O atoms connected one to another by C—H, C—C, C—O single bonds and C=O double bonds, and having at least one C—C(=O)—C group. Exemplary ketones having from 3 to 4 carbon atoms include acetone, 1-methoxy-2-propanone, and 2-butanone.

In some embodiments, the solvent is generally capable of solubilizing and/or displacing brine and/or condensate in the fracture. Examples of brine include connate or non-connate water, mobile or immobile water and the like. For example, the solvent may be capable of at least one of solubilizing or displacing brine in the fracture. Likewise, the solvent may be, for example, capable of at least one of solubilizing or displacing condensate in the fracture. In some embodiments, methods according to the present invention are typically useful for treating fractures in hydrocarbon-bearing formations containing brine and/or condensate.

Although not wanting to be bound by theory it is believed that the effectiveness of compositions described herein for improving the conductivity of a particular fracture having brine (and/or condensate) therein will typically be determined by the ability of the composition to dissolve the quantity of brine (and/or condensate) present in the fracture. Hence, at a given temperature greater amounts of compositions having lower brine (and/or condensate) solubility (i.e., compositions that can dissolve a relatively lower amount of brine or condensate) will typically be needed than in the case of compositions having higher brine (and/or condensate) solubility and containing the same surfactant at the same concentration.

Typically, compositions useful in practicing the present invention include from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight of the nonionic fluorinated polymeric surfactant, based on the total weight of the composition. For example, the amount of the nonionic fluorinated polymeric surfactant in the compositions may be in a range of from 0.01 to 10; 0.1 to 10, 0.1 to 5, 1 to 10, or even in a range from 1 to 5 percent by weight of the nonionic fluorinated polymeric surfactant, based on the total weight of the composition. Lower and higher amounts of the nonionic fluorinated polymeric surfactant in the compositions may also be used, and may be desirable for some applications.

The amount of solvent typically varies inversely with the amount of components in compositions useful in practicing the present invention. For example, based on the total weight of the composition the solvent may be present in the composition in an amount of from at least 10, 20, 30, 40, or 50 percent by weight or more up to 60, 70, 80, 90, 95, 98, or even 99 percent by weight, or more.

In some embodiments, compositions useful in practicing the present invention may further include water (e.g., in the solvent). In some embodiments, compositions according to the present invention are essentially free of water (i.e., contains less than 0.1 percent by weight of water based on the total weight of the composition).

The ingredients for compositions described herein including nonionic fluorinated polymeric surfactant and solvent can be combined using techniques known in the art for combining these types of materials, including using conventional magnetic stir bars or mechanical mixer (e.g., in-line static mixer and recirculating pump).

Generally, the amount of the nonionic fluorinated polymeric surfactant and solvent (and type of solvent) is dependent on the particular application since conditions typically vary between fractures in hydrocarbon-bearing formations, for example, fractures at different depths in the formation, and even over time in a given fracture. Advantageously, methods according to the present invention can be customized for individual fractures and conditions.

Without wishing to be bound by theory, it is believed that more desirable fracture treatment results are obtained when the composition used in a particular hydrocarbon-bearing fracture is homogenous at the conditions (e.g., temperature(s) and brine composition) encountered in the formation. Accordingly, the fluid amount and type is selected so that it at least one of solubilizes or displaces a sufficient amount of brine in the formation such that when the composition is added to the fracture, the nonionic fluorinated polymeric surfactant has a cloud point that is above at least one temperature found in the fracture. In some embodiments, the fluid amount and type is selected so that it at least one of solubilizes or displaces a sufficient amount of brine in the formation such that when the composition is contacting the fracture, the fracture is substantially free of precipitated salt.

Methods according to the present invention may be useful, for example, for recovering hydrocarbons (e.g., at least one of methane, ethane, propane, butane, hexane, heptane, or octane) from hydrocarbon-bearing subterranean clastic formations (in some embodiments, predominantly sandstone) or from hydrocarbon-bearing subterranean non-clastic formations (in some embodiments, predominantly limestone).

Referring to FIG. 1, an exemplary offshore oil and gas platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

Also shown in FIG. 2, a treatment zone is depicted next to casing 34, cement 36 within perforation 50. In the expanded view, fracture 57 is shown in which proppant 60 has been added. Fracture 57 is shown in relation to "crushed zone" 62 and regions surrounding wellbore 32 region showing virgin hydrocarbon-bearing formation 14. Damaged zone 64 has a lower permeability and is shown between virgin hydrocarbon formation 14 and casing 34.

While the drawing depicts an offshore operation, the skilled artisan will recognize that the compositions and methods for treating a production zone of a wellbore may also be suitable for use in onshore operations. Also, while the drawing depicts a vertical well, the skilled artisan will also recognize that methods of the present invention may also be useful, for example, for use in deviated wells, inclined wells or horizontal wells.

Figure 3:
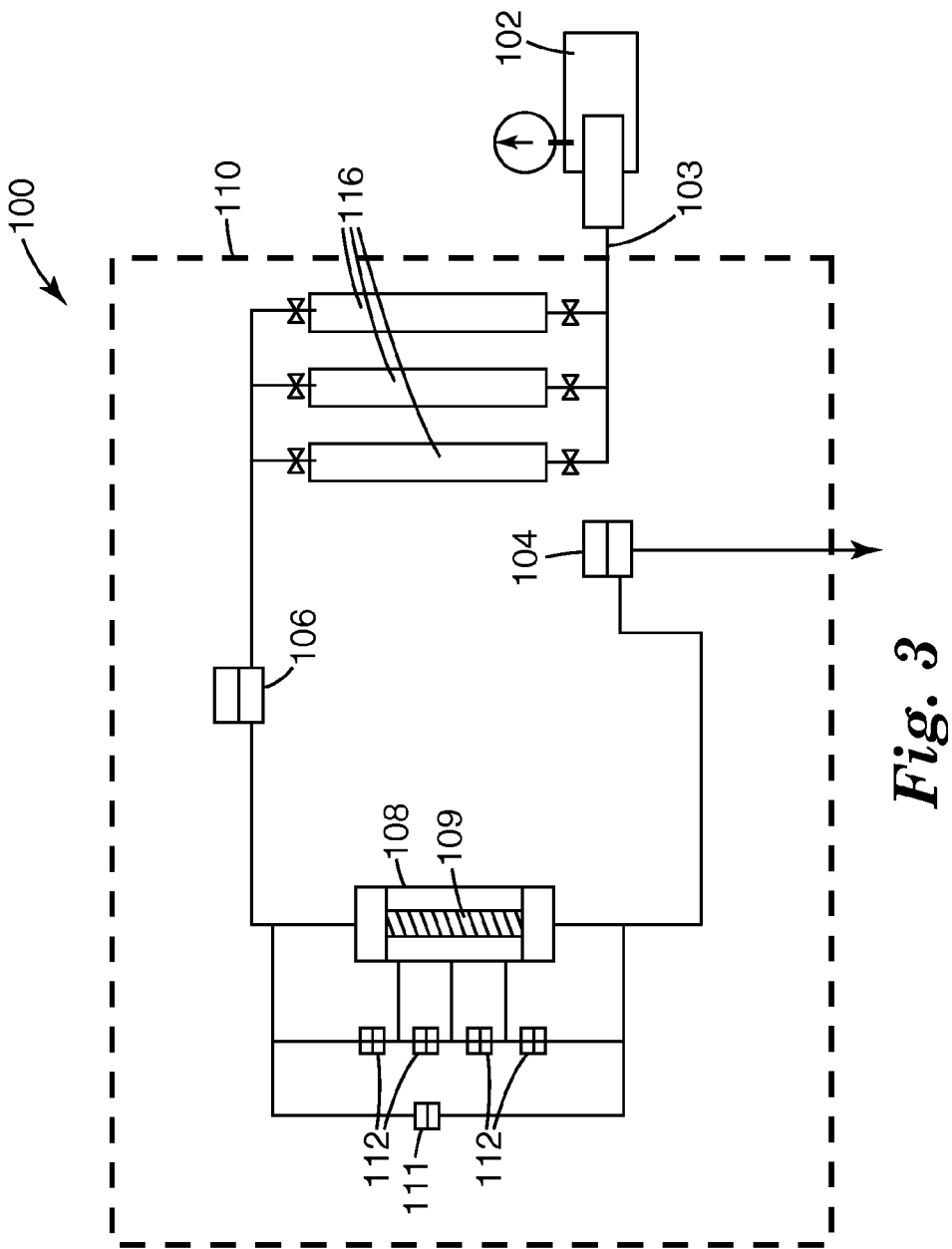
FIG. 3 is a schematic illustration of the core flood set-up for testing cores samples and other materials using the compositions and methods of the present invention.

A schematic diagram of core flood apparatus 100 used to determine relative permeability of the substrate sample is shown in FIG. 3. Core flood apparatus 100 included positive displacement pumps (Model No. 1458; obtained from General Electric Sensing, Billerica, Mass.) 102 to inject fluid 103 at constant rate in to fluid accumulators 116. Multiple pressure ports 112 on core holder 108 were used to measure pressure drop across four sections (2 inches (5.1 cm) in length each) of core 109. Pressure port 111 was used to measure the pressure drop across the whole core. Two back-pressure regulators (Model No. BPR-50; obtained from Temco, Tulsa, Okla.) 104, 106 were used to control the flowing pressure downstream and upstream, respectively, of core 109. The flow of fluid was through a vertical core to avoid gravity segregation of the gas. High-pressure core holder (Hassler-type Model UTPT-1x8-3K-13 obtained from Phoenix, Houston, Tex.) 108, back-pressure regulators 106, fluid accumulators 116, and tubing were placed inside pressure-temperature-controlled oven (Model DC 1406F; maximum temperature rating of 650° F. (343° C.) obtained from SPX Corporation, Williamsport, Pa.) at the temperatures tested.

Typically, it is believed to be desirable to allow for a shut-in time after fractures in the hydrocarbon-bearing formations are contacted with the compositions described herein. Exemplary set in times include a few hours (e.g., 1 to 12 hours), about 24 hours, or even a few (e.g., 2 to 10) days.

The skilled artisan, after reviewing the instant disclosure, will recognize that various factors may be taken into account in practice of the present invention including, for example, the ionic strength of the composition, pH (e.g., a range from a pH of about 4 to about 10), and the radial stress at the wellbore (e.g., about 1 bar (100 kPa) to about 1000 bars (100 MPa)).

Typically, after treatment according to the present invention hydrocarbons are then obtained from the wellbore at an increased rate, as compared the rate prior to treatment. In some embodiments, the fracture has at least one first conductivity prior to contacting the fracture with the composition and at least one second conductivity after contacting the fracture with the composition, and wherein the second conductivity is at least 5 (in some embodiments, 10, 20, 30, 40, 50, 60, 70, 80, 90, 100, 110, 120, 130, 140, or even 150) percent higher than the first conductivity.

Methods according to the present invention may be practiced, for example, in a laboratory environment (e.g., on a core sample (i.e., a portion) of a hydrocarbon-bearing formation) or in the field (e.g., on a subterranean hydrocarbon-bearing formation situated downhole in a well). Typically, methods according to the present invention are applicable to downhole conditions having a pressure in a range of from about 1 bar (100 kPa) to about 1000 bars (100 MPa) and a temperature in a range from about 100° F. (37.8° C.) to 400° F. (204° C.), although they may also be useful to treat hydrocarbon-bearing formations under other conditions.

In addition to brine and/or condensate, other materials (e.g., asphaltene or water) may be present in the hydrocarbon-bearing formation. Methods according to the present invention may also be useful in those cases.

Various methods (e.g., pumping under pressure) known to those skilled in the oil and gas art can be used in accordance with the present invention to contact fractures in hydrocarbon-bearing subterranean formations with compositions comprising solvent and nonionic fluorinated polymeric surfactant. Coil tubing, for example, may be used to deliver the treatment composition to a particular fracture. In some embodiments, in practicing the present invention it may be desirable to isolate the fracture (e.g., with conventional packers) to be contacted with the treatment composition.

Advantages and embodiments of this invention are further illustrated by the following examples, but the particular materials and amounts thereof recited in these examples, as well as other conditions and details, should not be construed to unduly limit this invention. Unless otherwise noted, all parts, percentages, ratios, etc. in the examples and the rest of the specification are by weight.

Example 1

Preparation of Composition A. A nonionic fluorinated polymeric surfactant ("Nonionic Fluorinated Polymeric Surfactant A") was prepared essentially as in Example 4 of U.S. Pat. No. 6,664,354 (Savu), except using 15.6 grams (g) of 50/50 mineral spirits/organic peroxide initiator (tert-butyl peroxy-2-ethylhexanoate obtained from Akzo Nobel, Arnhem, The Netherlands under the trade designation "TRIGONOX-21-C50") in place of 2,2'-azobisisobutyronitrile, and with 9.9 g of 1-methyl-2-pyrrolidinone added to the charges.

Nonionic Fluorinated Polymeric Surfactant A (2% by weight) was combined with propylene glycol (69% by weight) and isopropanol (29% by weight). The components were mixed together using a magnetic stirrer and magnetic stir bar.

Fractured Core Flood Evaluation

A core with the dimensions specified below was cut from a source rock block. The core was dried in an oven at 100° C. for 24 hrs and then was weighed. The core was then wrapped with polytetrafluoroethylene (PTFE), aluminum foil and shrink wrapped with heat shrink tubing (obtained under the trade designation "TEFLON HEAT SHRINK TUBING" from Zeus, Inc., Orangeburg, S.C.). The wrapped core was placed into a core holder inside the oven at the experimental temperature.

Core Flood Setup. A schematic diagram of a core flood apparatus 100 used to determine relative permeability of a substrate sample (i.e., core) is shown in FIG. 3. Core flood apparatus 100 included positive displacement pumps (Model No. 1458; obtained from General Electric Sensing, Billerica, Mass.) 102 to inject fluid 103 at constant rate into fluid accumulators 116. Multiple pressure ports 112 on high-pressure core holder 108 (Hassler-type Model UTPT-1x8-3K-13 obtained from Phoenix, Houston, Tex.) were used to measure pressure drop across four sections (2 inches (5.1 cm) in length each) of core 109. An additional pressure port 111 on core holder 108 was used to measure pressure drop across the entire length (8 inches (20.4 cm)) of core 109. Two back-pressure regulators (Model No. BPR-50; obtained from Temco, Tulsa, Okla.) 104, 106 were used to control the flowing pressure downstream and upstream, respectively, of core 109.

The entire apparatus, with the exception of the positive displacement pumps 102, was enclosed inside pressure- and temperature-controlled oven 110 (Model DC 1406F; maximum temperature rating of 650° F. (343° C.); obtained from SPX Corporation, Williamsport, Pa.) at 279° F. (137° C.). The maximum flow rate of fluid was 5,500 mL/hr. The flow of fluid was through a vertical core to avoid gravity segregation of the gas.

Fractured Core Preparation. A 1 inch (2.5 cm) diameter reservoir core plug was sawed in half longitudinally and then put in a standard laboratory oven to dry overnight at 150° C. One half of the rock was rested on the lab bench and two long spacers were laid on top of it with the ends protruding beyond one end of the core and flush with the other. The other half was placed on top. The core was then wrapped with polytetrafluoroethylene (PTFE) tape. The resulting fracture space was the width of the spacers (0.22 cm). The void was then filled with sand (obtained from US Silica, under the trade designation "OTTAWA F35") having an average mesh size of about 35 corresponding to an average grain diameter of on the order of 0.04 cm. The core was lightly tapped to distribute the sand throughout the fracture space and then the spacers were slowly pulled out as the sand filled the void. The fractured rock was wrapped with aluminum foil and shrink wrapped with heat shrink tubing (obtained under the trade designation "TEFLON HEAT SHRINK TUBING" from Zeus, Inc., Orangeburg, S.C.) and then loaded into core holder 108 with a 1 inch (2.5 cm) sleeve.

The porosity was measured from the mass of sand used and the grain density. The pore volume is the product of the bulk volume and the porosity. Properties of the fracture are given in Table 1, below.

TABLE 1

| Aperture | 0.22 cm |
|---|---|
| Width | 2.47 cm |
| Length | 4.66 cm |
| Porosity | 36% |
| pore volume | 0.91 cc |

Table 2 (below) summarizes the brine composition used in this example.

TABLE 2

| Chemical | g/L |
|---|---|
| NaCl | 225.2 |
| CaCl$_2$ | 1.5 |
| KCl | 3.1 |

Initial permeability of the fracture was measured using nitrogen. Measurements were made at high flow rates to get more accurate pressure data, which resulted in contribution of non-Darcy flow in the pressure drop measurements. The measured permeability varied from 7.8 to 3.6 Darcy for flow rates between 2750 cc/hr to 5502 cc/hr. The decrease in permeability with increasing flow rate signifies the effect of non-Darcy flow. The actual permeability of the fracture was later measured using liquid (Composition A) which can be flowed at a low rates to avoid non-Darcy flow and still obtain high pressure drop data because of high viscosity. The initial brine saturation was established by flooding brine through the fracture followed by nitrogen to reduce its saturation to residual.

Synthetic Condensate Composition. A synthetic hydrocarbon mixture with a small amount of H$_2$O was prepared that exhibits retrograde gas condensate behavior. The composition of the fluid mixture is given in Table 3, below.

TABLE 3

| Chemical | Mole Percent | Mass (grams) |
|---|---|---|
| n-Pentadecane | 1.47 | 42.9 |
| n-Decane | 1.23 | 24.0 |
| n-Heptane | 1.23 | 16.9 |
| Propane | 0.98 | 5.9 |
| Methane | 93.14 | 205.4 |
| Water | 1.96 | 4.9 |

Core Flooding Procedure. Referring again to FIG. 3, a two-phase flood with the fluid mixture was performed using the dynamic flashing method, which is also known as the pseudo-steady state method, by flashing the fluid through the upstream back-pressure regulator 106 set above the dew point pressure at 5500 psig ($3.79 \times 10^7$ Pa) to the core pressure set below the dew point pressure by the downstream back-pressure regulator 104. This procedure was done at a core pressure of 1500 psig ($1.03 \times 10^7$ Pa). The net confining stress on the fracture was 1500 psig. The procedure was conducted at 279° F. (137.2° C.).

The initial two-phase flow was followed with a pre-flush of fluid containing 30% by weight propylene glycol (PG) and 70% by weight isopropanol (IPA) to reduce the liquid saturation in the fracture. This was followed with the two-phase flood of gas and condensate under the same conditions as described above. Again the measurements were done at high flow rates to get a sufficient pressure drop. The results are presented in Table 4 (below).

TABLE 4

| Core Flow rate (cc/hr) | Pressure drop psi, (kPa) | Nc | Gas Relative Permeability |
|---|---|---|---|
| 514 | 0.19 (1.31) | 1.84E−4 | 0.243 |
| 815 | 0.26 (1.79) | 1.51E−4 | 0.281 |
| 1631 | 0.55 (3.79) | 5.32E−4 | 0.266 |
| 2899 | 1.2 (8.27) | 1.16E−3 | 0.217 |

The values of the relative permeability are high because of the high capillary number at these flow rates. As the flow rate increases, the non-Darcy flow causes the relative permeability to decrease more than the increase in the capillary number causes it to increase.

The fracture was then treated with Composition A. 40 pore volumes of Composition A were injected into the core at a flow rate 40 ml/hr. The amount of pore volumes flowed through the core will be apparent to the skilled artisan. The core flood as measured with this invention mimic or equate to the first few inches of the formation and/or fracture. For example, the skilled artisan will be able to equate the number of pore volumes flowing through the core to the volume of fluid flowing through first few inches of the formation or fracture next to the wellbore. Near the end of the treatment flood the flow rate was increased to 903 ml/hr to get a higher-pressure drop, which gave a permeability of about 14 Darcy. Not wishing to be bound by theory, it is believed that non-Darcy flow does not affect the liquid permeability due to the low Reynolds number when using liquid rather than gas, so the value of 14 Darcy permeability is a measure of the true permeability of the fracture. The fluid flow was then stopped for 15 hours with Composition A in the fracture.

Post-treatment gas condensate two-phase flow was then done under the same conditions as the pre-treatment two-phase flow. The results are presented in Table 5 (below) along with the improvement factor, which was calculated as the ratio of gas relative permeability after the treatment to the gas relative permeability following the pre-flush under the same conditions. Again, not wishing to be bound by theory, it is believed that the improvement factor ranges from 1.41 to 1.72 for different flow rates because of the competing effects of capillary number and non-Darcy flow. The data can also be interpreted in terms of the conductivity of the fracture, which is a more conventional measure of its ability to conduct fluid. Relative to the initial conductivity before the preflush when the fracture still has brine in it, the increase in the fracture conductivity ranged from 2.35 to 2.87.

TABLE 5

| Core Flow rate (cc/hr) | Pressure drop psi, (kPa) | Nc | Gas Relative Permeability | Improvement factor |
|---|---|---|---|---|
| 514 | 0.11 (0.76) | 1.06E−4 | 0.419 | 1.72 |
| 815 | 0.17 (1.17) | 1.64E−4 | 0.434 | 1.54 |
| 1631 | 0.37 (2.55) | 3.58E−4 | 0.395 | 1.48 |
| 2899 | 0.84 (5.79) | 8.22E−4 | 0.306 | 1.41 |

Example 2

Core Preparation. A 1 inch (2.5 cm) diameter Berea core was sawed in half longitudinally dry as preparation for packing an artificial fracture with sand ("OTTAWA F35") was selected as the sand to be used to fill the fracture void. This sand has an average mesh size of about 35 corresponding to an average grain diameter of on the order of 0.04 cm.

One half of the rock was rested on the lab bench and two long spacers were laid on top of it with the ends protruding beyond one end of the core and flush with the other. The other half was placed on top. The core was then wrapped with polytetrafluoroethylene (PTFE) tape. The resulting fracture space was the width of the spacers. The void was then filled with sand the spacers were slowly pulled out as the sand filled the void. The core was lightly tapped to distribute the sand throughout the fracture space and then the spacers were removed. The fractured rock was wrapped with aluminum foil and shrink wrapped with shrink tube ("TEFLON") and then loaded into a core holder with a 1 inch (2.54 cm) sleeve. Fracture data are given in Table 6, below.

TABLE 6

| | |
|---|---|
| Aperture | 0.24 cm |
| Width | 2.48 cm |
| Length | 20.3 cm |
| Porosity | 36.6% |
| pore volume | 4.43 cc |

Core Flooding Results—Initial gas permeability. Initial permeability of the core was measured using nitrogen at 80° F. (26.7° C.). Measurements were done at two core pressures and three flow rates at each core pressure. Measurements were made at high flow rates to get more accurate pressure data, which resulted in Reynolds number much higher than 1 and thus contribution of non-Darcy flow in the pressure drop measurements. The measured permeability varied from 19 to 12 Darcy with increasing Reynolds number. The decrease in permeability with increasing Reynolds number signifies the effect of non-Darcy flow. Thus the actual permeability of the fracture is higher than these values and was later measured using liquid flow under laminar flow conditions. The actual permeability of the fracture was later measured with liquid and found to be 22 Darcy.

The initial brine saturation was established by injecting a measured amount of brine in the vacuumed fracture. The brine composition was 30 g/L of NaCl.

Gas permeability at initial water saturation. End point gas relative permeability at initial water saturation was measured using nitrogen at 80° F. (26.7° C.). The values ranged from 16.1 Darcy at low flow rate to 11.4 Darcy at high flow rate. The values at the higher rates are lower due to non-Darcy flow.

Initial Condensate. A synthetic hydrocarbon mixture with a small amount of $H_2O$ was prepared that exhibits retrograde gas condensate behavior. The composition of the fluid mixture is given in Table 7, below.

TABLE 7

| Chemical | Mole % |
|---|---|
| n-Pentadecane | 1.47 |
| n-Decane | 1.23 |
| n-Heptane | 1.23 |
| Propane | 0.98 |
| Methane | 93.14 |
| Water | 1.96 |

A two-phase flood with this fluid mixture was done using the dynamic flashing method, which is also known as the pseudo-steady state method, by flashing the gas through a back-pressure regular set above the dew point pressure at 5500 psig (37.91 MPa) to the core pressure set below the dew point pressure by the downstream back-pressure regulator. This procedure was done at a core pressure of 1420 psig (9.79 MPa). Again the measurements were done at high flow rates to get a sufficient pressure drop to get a sufficient pressure drop. The results are presented in Table 8, below. Again, not wishing to be bound by theory, it is believed that the values of the relative permeability show an increasing trend with the flow rates due to increasing capillary number, except at the highest flow rate where the damage due to non-Darcy flow is more significant than the improvement due to capillary number. Thus, the values are actually apparent values since no correction has been made for the effect of non-Darcy flow. Although not wanting to be bound by theory, it is believed that the conductivity of the fracture is what directly affects the productivity of a gas well, and the conductivity is directly proportional to the apparent gas relative permeability values.

TABLE 8

| Core Flow rate (cc/hr) | Pressure drop psi (kPa) | Nc | Gas Relative Permeability | Condensate Relative Permeability |
|---|---|---|---|---|
| 206 | 0.23 (1.59) | 3.14E−5 | 0.089 | 0.038 |
| 412 | 0.30 (2.07) | 4.04E−5 | 0.139 | 0.058 |
| 824 | 0.45 (3.1) | 6.04E−5 | 0.186 | 0.078 |
| 1674 | 0.96 (6.62) | 1.29E−04 | 0.174 | 0.073 |
| 2883 | 2.53 (17.4) | 3.42E−04 | 0.115 | 0.048 |

Treatment. The fracture was then treated with Nonionic Fluorinated Polymeric Surfactant A (2% by weight) combined with propylene glycol (79% by weight) and isopropanol (19% by weight). The components were mixed together using a magnetic stirrer and magnetic stir bar. The composition of the treatment solution is given in Table 9, below. 40 pore volumes of treatment solution were injected into the fracture. The steady state pressure drop during the treatment gave a permeability of 22 Darcy. Non-Darcy flow does not affect the liquid permeability due to the low Reynolds number when using liquid rather than gas, so the value of 22 Darcy is the true permeability of the fracture. The fluid flow was then stopped for 15 hours with the treatment in the fracture.

TABLE 9

| Component | wt % |
|---|---|
| Nonionic Fluorinated Polymeric Surfactant A | 2 |
| Propylene Glycol | 79 |
| IPA | 19 |

Post Treatment Condensate. Post-treatment two-phase gas condensate flow was then done under the same conditions as the pre-treatment two-phase gas condensate flow. The results are presented in Table 10 (below) along with the improvement factor, which was calculated as the ratio of gas relative permeability after the treatment to the gas relative permeability before the treatment under the same conditions. The results show that the treatment improved the gas and condensate relative permeability by a factor of 2.54 at the lowest flow rate of 206 cc/hr where the effect of non-Darcy flow is negligible. At the highest flow rate, which corresponds to the highest capillary number and the highest effect of non-Darcy flow, the improvement factor was 2.04. Although not wishing to be bound by theory, it is believed that the gas relative permeability first increases with flow rate due to the favorable effect of higher capillary numbers and then decreases with even higher flow rate due to the unfavorable effect of non-Darcy flow.

TABLE 10

| Core Flow rate (cc/hr) | Pressure drop psi (kPa) | Gas Relative Permeability | Condensate Relative Permeability | Improvement Factor |
|---|---|---|---|---|
| 206 | 0.09 (0.62) | 0.227 | 0.096 | 2.54 |
| 412 | 0.13 (0.89) | 0.313 | 0.132 | 2.25 |
| 824 | 0.24 (1.65) | 0.347 | 0.146 | 1.87 |
| 1674 | 0.55 (3.79) | 0.303 | 0.128 | 1.74 |
| 2883 | 1.24 (8.55) | 0.235 | 0.099 | 2.04 |

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

What is claimed is:

1. A method of treating a hydrocarbon-bearing formation having at least one fracture, wherein the fracture has a volume, and wherein the fracture has a plurality of proppants therein, the method comprising:
contacting the fracture with an amount of a composition, wherein the amount of the composition is based at least partially on the volume of the fracture, wherein the composition comprises solvent and a nonionic fluorinated polymeric surfactant, and wherein the nonionic fluorinated polymeric surfactant comprises:
at least one divalent unit represented by formula:

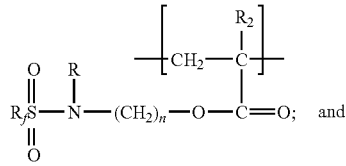

and a poly(alkyleneoxy) segment
wherein
$R_f$ represents a perfluoroalkyl group having from 1 to 8 carbon atoms;
R and $R_2$ are each independently hydrogen or alkyl of 1 to 4 carbon atoms; and
n is an integer from 2 to 10;
allowing the nonionic polymeric fluorinated surfactant to interact with at least a portion of the plurality of proppants.

2. The method of claim 1, wherein the fracture has brine therein.

3. The method of claim 2, wherein when the composition is contacting the fracture, the fracture has a temperature, and the nonionic fluorinated polymeric surfactant has a cloud point that is above the temperature of the fracture.

4. The method of claim 2, wherein when the composition is contacting the fracture, the fracture is substantially free of precipitated salt.

5. The method of claim 1, wherein the hydrocarbon-bearing formation is a non-clastic formation.

6. The method of claim 1, wherein the solvent comprises at least one of a polyol or polyol ether, wherein the polyol and polyol ether independently have from 2 to 25 carbon atoms; and wherein the solvent comprises at least one of a monohydroxy alcohol, ether, or ketone independently having from 1 to 4 carbon atoms.

7. The method of claim 1, wherein the composition further comprises water.

8. The method of claim 1, wherein the plurality of proppants comprises at least one of sand, sintered bauxite, thermoplastic, ceramic, organic matter or clay.

9. The method of claim 1, further comprising obtaining hydrocarbons from a well bore penetrating the hydrocarbon-bearing formation.

10. The method of claim 1, wherein the hydrocarbon-bearing formation has at least one first gas conductivity prior to contacting the fracture with the composition and at least one second gas conductivity after contacting the fracture with the composition, and wherein the second gas conductivity is at least 5 percent higher than the first gas conductivity.

11. The method of claim 1, wherein the poly(alkyleneoxy) segment comprises at least one divalent unit represented by formula:

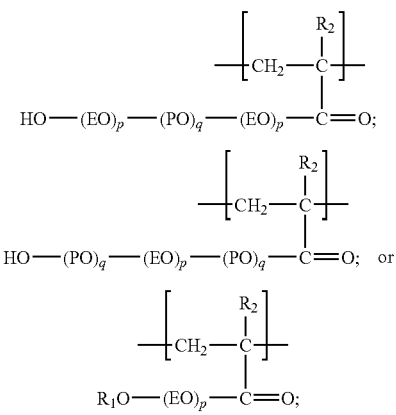

wherein $R_1$ and $R_2$ are each independently hydrogen or alkyl of 1 to 4 carbon atoms;

EO represents —$CH_2CH_2O$—;

each PO independently represents —$CH(CH_3)CH_2O$— or —$CH_2CH(CH_3)O$—;

each p is independently from 1 to about 128; and each q is independently from 0 to about 55.

12. A method of treating a hydrocarbon-bearing formation having at least one fracture, wherein the fracture has a volume, wherein the fracture has brine therein, and wherein the fracture has a plurality of proppants therein, the method comprising:

pre-treating the hydrocarbon-bearing formation with a fluid that at least partially solubilizes or at least partially displaces the brine in the fracture;

contacting the proppants in the fracture with an amount of a composition, wherein the amount of the composition is based at least partially on the volume of the fracture, wherein the composition comprises solvent and a nonionic fluorinated polymeric surfactant, and wherein the nonionic fluorinated polymeric surfactant comprises:

at least one divalent unit represented by formula:

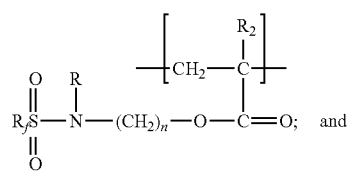

a poly(alkyleneoxy) segment wherein $R_f$ represents a perfluoroalkyl group having from 1 to 8 carbon atoms;

R and $R_2$ are each independently hydrogen or alkyl of 1 to 4 carbon atoms; and n is an integer from 2 to 10;

allowing the nonionic polymeric fluorinated surfactant to interact with at least a portion of the proppants.

13. The method of claim 12, wherein when the composition is contacting the proppants in the fracture, the fracture has a temperature, and the nonionic fluorinated polymeric surfactant has a cloud point that is above the temperature of the fracture.

14. The method of claim 12, wherein when the composition is contacting the fracture, the fracture is substantially free of precipitated salt.

15. The method of claim 12, wherein the plurality of proppants comprises at least one of sand, sintered bauxite, ceramic, thermoplastic, organic matter, or clay.

16. The method of claim 12, wherein the fluid comprises at least one of toluene, diesel, heptane, octane, or condensate; or wherein the fluid comprises at least one of methane, carbon dioxide, or nitrogen.

17. The method of claim 12, wherein the fluid comprises at least one of a polyol or polyol ether, wherein the polyol and polyol ether independently have from 2 to 25 carbon atoms.

18. The method of claim 12, wherein the fluid comprises water or at least one monohydroxy alcohol, ether, or ketone independently having from 1 to 4 carbon atoms.

19. The method of claim 12, wherein the fracture has at least one first conductivity prior to contacting the fracture with the composition and at least one second conductivity after contacting the fracture with the composition, and wherein the second conductivity is at least 5 percent higher than the first conductivity.

20. The method of claim 12, wherein the poly(alkyleneoxy) segment comprises at least one divalent unit represented by formula:

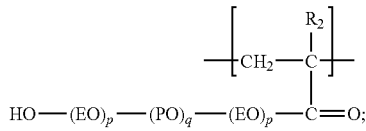

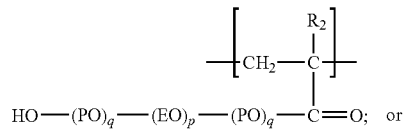

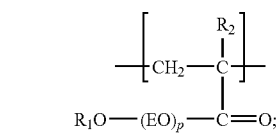

wherein $R_1$ and $R_2$ are each independently hydrogen or alkyl of 1 to 4 carbon atoms;

EO represents —$CH_2CH_2O$—;

each PO independently represents —$CH(CH_3)CH_2O$— or —$CH_2CH(CH_3)O$—;

each p is independently from 1 to about 128; and each q is independently from 0 to about 55.

* * * * *